(12) United States Patent
Khan

(10) Patent No.: US 9,764,240 B2
(45) Date of Patent: Sep. 19, 2017

(54) ONLINE PROCESS FOR RECOMMENDING FRIENDS BASED ON GAME PLAYING HABITS

(75) Inventor: Mohammed Khan, San Diego, CA (US)

(73) Assignee: SONY INTERACTIVE ENTERTAINMENT AMERICA LLC, San Mateo, CA (US)

( * ) Notice: Subject to any disclaimer, the term of this patent is extended or adjusted under 35 U.S.C. 154(b) by 874 days.

(21) Appl. No.: 12/904,053

(22) Filed: Oct. 13, 2010

(65) Prior Publication Data

US 2012/0094762 A1    Apr. 19, 2012

(51) Int. Cl.
*A63F 9/00* (2006.01)
*A63F 13/795* (2014.01)
*G06Q 10/10* (2012.01)
*G06Q 30/02* (2012.01)
*G06Q 50/00* (2012.01)

(52) U.S. Cl.
CPC ......... *A63F 13/795* (2014.09); *G06Q 10/101* (2013.01); *G06Q 30/02* (2013.01); *G06Q 50/01* (2013.01); *A63F 2300/407* (2013.01); *A63F 2300/5566* (2013.01)

(58) Field of Classification Search
None
See application file for complete search history.

(56) References Cited

U.S. PATENT DOCUMENTS

| | | | |
|---|---|---|---|
| 6,352,479 B1 * | 3/2002 | Sparks, II | 463/42 |
| 6,641,481 B1 * | 11/2003 | Mai et al. | 463/42 |
| 7,614,955 B2 * | 11/2009 | Farnham et al. | 463/42 |
| 7,677,970 B2 * | 3/2010 | O'Kelley et al. | 463/25 |
| 7,846,024 B2 * | 12/2010 | Graepel et al. | 463/42 |
| 8,083,591 B2 * | 12/2011 | Fulton et al. | 463/42 |
| 8,388,446 B1 * | 3/2013 | Craine et al. | 463/42 |
| 2005/0192097 A1 * | 9/2005 | Farnham et al. | 463/42 |
| 2006/0116205 A1 * | 6/2006 | Miyaji | 463/41 |
| 2006/0121990 A1 * | 6/2006 | O'Kelley et al. | 463/42 |
| 2006/0247060 A1 * | 11/2006 | Hanson et al. | 463/42 |
| 2006/0287096 A1 * | 12/2006 | O'Kelley et al. | 463/42 |
| 2007/0026934 A1 * | 2/2007 | Herbrich et al. | 463/23 |
| 2007/0093297 A1 * | 4/2007 | Moshal | 463/42 |
| 2008/0026827 A1 * | 1/2008 | Skotarczak et al. | 463/25 |
| 2008/0045335 A1 * | 2/2008 | Garbow et al. | 463/29 |
| 2008/0318655 A1 * | 12/2008 | Davies | 463/16 |
| 2009/0005150 A1 * | 1/2009 | Haveson | 463/20 |

* cited by examiner

*Primary Examiner* — Seng H Lim
(74) *Attorney, Agent, or Firm* — Procopio, Cory, Hargreaves & Savitch, LLP

(57) ABSTRACT

Recommending game-playing friends or buddies, including: receiving at least one of playing habits, behaviors, and preferences of online game players; selecting a subset of the online game players matching a set number of criteria of the at least one of playing habits, behaviors, and preferences that are similar or complementary; and recommending the subset of the online game players selected as matching a set number of criteria as game-playing friends or buddies. Keywords include improved game experience, social building, and community growing.

15 Claims, 4 Drawing Sheets

ONLINE PROCESS FOR RECOMMENDING FRIENDS BASED ON GAME PLAYING HABITS

BACKGROUND

Field of the Invention

The present invention relates to online games, and more specifically, to processes for recommending friends based on habits for playing such online games.

Background

Online games have recently gained popularity with Internet users. For example, a massively multiplayer online (MMO) game is an online computer game in which a large number of players interact with one another in a virtual world. MMO games are distinguished from single-player or small multi-player games by the game's persistent world, usually hosted by a game provider, which continues to exist and evolve even when the player is away from the game.

SUMMARY

The present invention provides for recommending game-playing friends based on a game player's habits for playing online games which promotes better playing experience for the game player.

In one implementation, a method of recommending game-playing friends or buddies is disclosed. The method includes: receiving at least one of playing habits, behaviors, and preferences of online game players; selecting a subset of the online game players matching a set number of criteria of the at least one of playing habits, behaviors, and preferences that are similar or complementary; and recommending the subset of the online game players selected as matching a set number of criteria as game-playing friends or buddies.

In another implementation, a system to recommend game-playing friends based on game player's habits for playing an online game is disclosed. The system includes: a game network configured to add game players logging into the game network to a list of players on the online game, the game network collecting playing habits of the game players; and a complex event engine configured to receive the list of players from the game network and the collected playing habits data from the storage unit, the complex event engine operating to process information including the list of players and the collected playing habits data to select a subset of the game players matching a set number of criteria including playing habits that are similar or complementary.

In a further implementation, a non-transitory tangible storage medium storing a computer program for recommending game-playing friends or buddies is disclosed. The computer program includes executable instructions that cause a computer to: receive at least one of playing habits, behaviors, and preferences of online game players; select a subset of the online game players matching a set number of criteria of the at least one of playing habits, behaviors, and preferences that are similar or complementary; and recommend the subset of the online game players selected as matching a set number of criteria as game-playing friends or buddies.

Other features and advantages of the present invention will become more readily apparent to those of ordinary skill in the art after reviewing the following detailed description and accompanying drawings.

DETAILED DESCRIPTION

Figure 1:
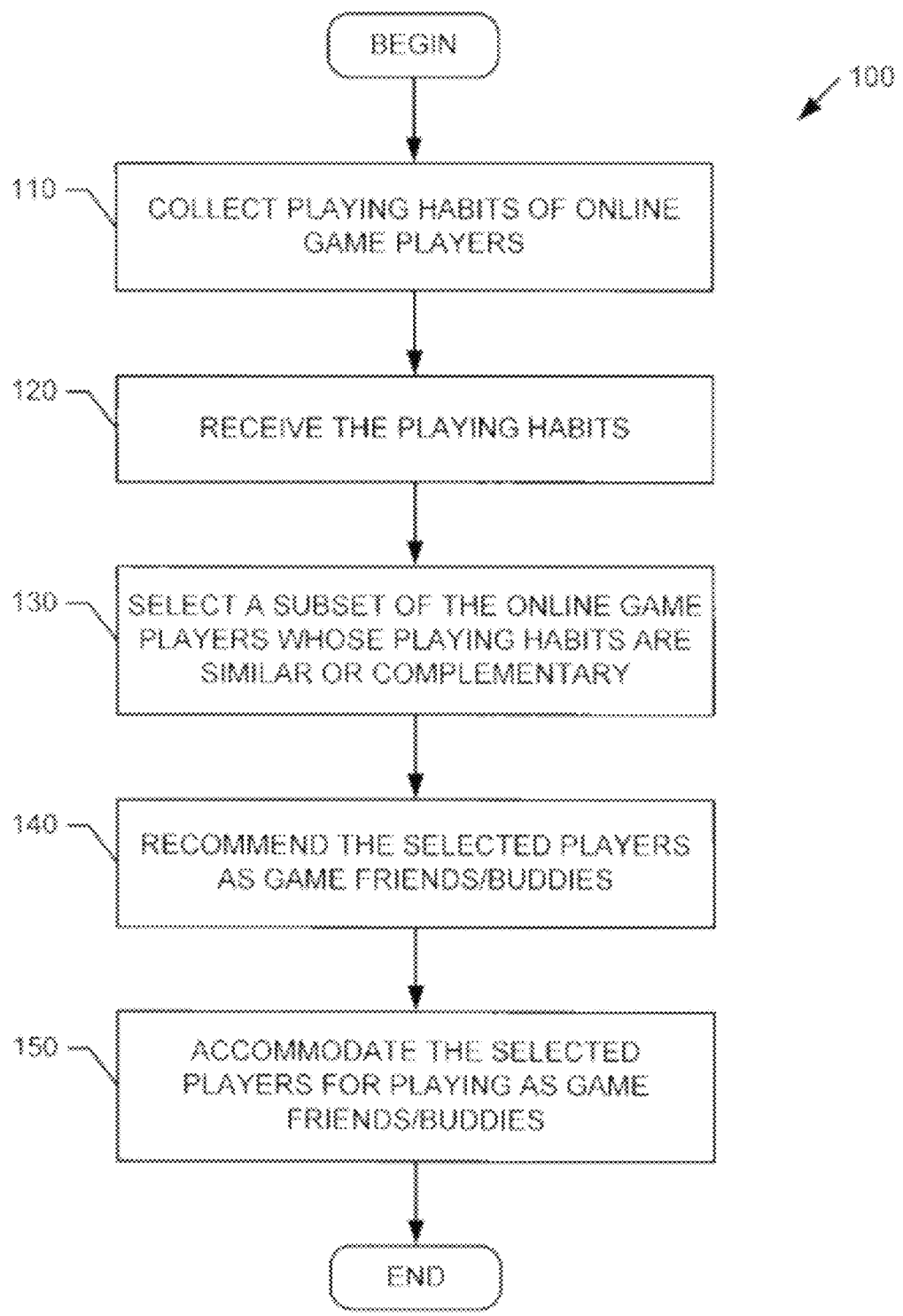
FIG. 1 is a flowchart illustrating a technique for recommending game-playing friends based on game player's habits for playing online games in accordance with one implementation of the present invention.

Certain implementations as disclosed herein provide for recommending game-playing friends based on a game player's habits for playing online games which promotes better playing experience for the game player. In one implementation, the recommendation is made to the game player. In another implementation, the recommendation is made to a game title which may pass the recommendation along to the game player at the game title's discretion. After reading this description it will become apparent how to implement the invention in various implementations and applications. However, although various implementations of the present invention will be described herein, it is understood that these implementations are presented by way of example only, and not limitation. As such, this detailed description of various implementations should not be construed to limit the scope or breadth of the present invention.

Although multiplayer online games have gained popularity with Internet users, an individual player may have difficulty convincing the player's real-world friends to play the games together because the friends may have significantly different schedules (e.g., time schedules) or skill levels (e.g., playing skills) to play the games with the player. In one implementation, game providers can track various "telemetry" data about habits, behaviors, and/or preferences of game players. The collected data may include time of day played, type of games played, interest of the player, clan membership of the player, type of friends in the real world, type of games owned or purchased, number of hours played, relationship to the player of the friend being recommended, and other similar data. The collected data can then be analyzed to recommend game playing friend(s) in the virtual world of the game with whom the player can play the games together. For example, a recommended online friend/buddy maybe someone who is often online at the substantially same times and/or has similar or complementary tastes for the games as the player.

In another implementation, to increase the likelihood of the player accepting the recommended "strangers," a social graph showing how the recommended "strangers" are related to the player through the current/existing friends (e.g., showing the number of degrees of separation between the recommended "stranger" and the player) can be presented to the player. Thus, in this implementation, the data collected by the game provider would include information identifying a player such as name and age of the player and friends so that the connections can be made between substantially all players playing the games. Although some of the data to be collected by the game provider may already be available to the game provider, for this implementation, the game provider needs to further analyze and/or process the data to generate useful information such as a social graph for each individual player.

In one implementation, a process for generating a recommended friends list for a game player includes evaluating other players currently in an online game with the game player. Upon evaluation, players matching a set number of criteria would be recommended as potential friends or buddies.

FIG. 1 is a flowchart 100 illustrating a technique for recommending game-playing friends based on game player's habits for playing online games in accordance with one implementation of the present invention. In the illustrated implementation of FIG. 1, playing habits of online game players are collected, at box 110. As discussed above, various "telemetry" data about habits, behaviors, and/or preferences of game players can be collected by game providers. The collected data may include time of day played, type of games played, interest of the player, clan membership of the player, type of friends in the real world, type of games owned or purchased, number of hours played, relationship to the player of the friend being recommended, and other similar data. The collected playing habit data is received, at box 120.

At box 130, online game players matching a set number of criteria including playing habits that are similar or complementary are selected. In one implementation, the selection process involves evaluating players currently in an online game with the game player for whom the potential friends or buddies are being recommended. In another implementation, the selection process involves evaluating all online game players whose playing habits are available to the evaluator (e.g., a game provider). The collected data can then be analyzed to recommend game playing friend(s) in the virtual world of the game with whom the player can play the games together. For example, a recommended online friend/buddy maybe someone who is often online at the substantially same times and/or has similar or complementary tastes for the games as the player.

Figure 2:
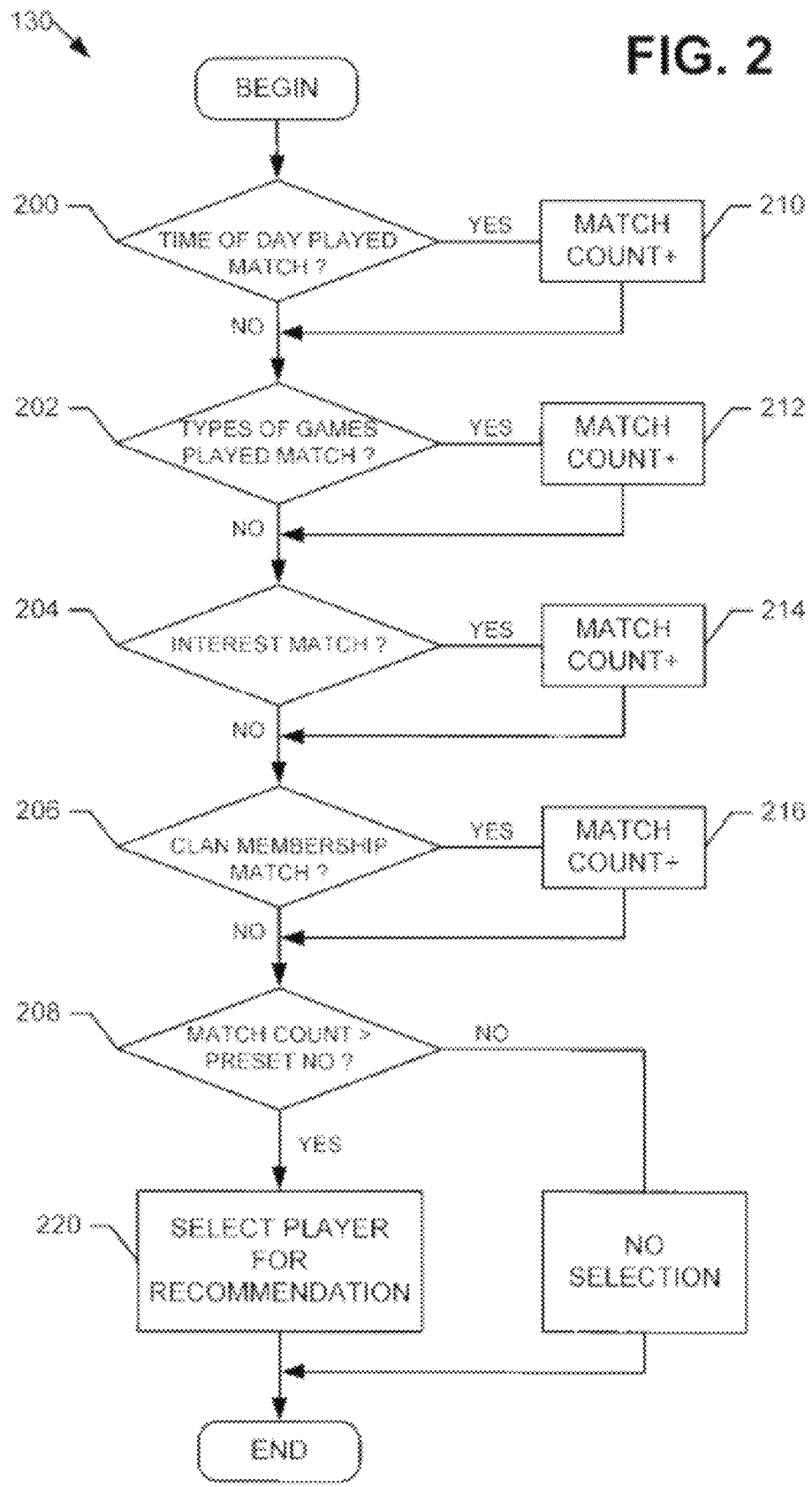
FIG. 2 is a flowchart illustrating a process for selecting online game players matching a set number of criteria in accordance with one implementation of the present invention.

FIG. 2 is a flowchart illustrating a process 130 for selecting online game players matching a set number of criteria in accordance with one implementation of the present invention. The process includes inquiring, at box 200, whether an online game player's favorite time of day at which the player mostly plays the game substantially matches the favorite playing time of the game player for whom the potential friends or buddies are being recommended. If the times substantially match, a match count is increased by a set number, at box 210.

Another inquiry is made, at box 202, whether types of games played by an online game player substantially matches or complements the types of games played by the game player for whom the potential friends or buddies are being recommended. If the types substantially match or complement each other, a match count is again increased by a set number, at box 212. Another inquiry is made, at box 204, whether general interests of an online game player substantially matches or complements the interests of the game player for whom the potential friends or buddies are being recommended. If the interests substantially match or complement each other, a match count is again increased by a set number, at box 214. Another inquiry is made, at box 206, whether clan memberships of an online game player substantially matches or complements the clan memberships the game player for whom the potential friends or buddies are being recommended. If the clan memberships substantially match or complement each other, a match count is again increased by a set number, at box 216. Further inquiries using other factors can be made to determine the compatibility of the online game players with the game player for whom the potential friends or buddies are being recommended.

A determination is made, at box 208, whether the match count kept at boxes 210, 212, 214, 216 is greater than a preset number. If it is determined, at box 208, that the match count is greater than a preset number, the online game player is recommended, at box 220, as a potential friend or buddy. Otherwise, the online game player is not selected for recommendation. The process 130 is then repeated for a next online game player.

In general, the inquiries are made against the data already collected and stored for the online game players rather than inquiring each online game player as the player enters the game. However, the inquiries can be made real-time to collect the data directly from the online game player as the player enters the game.

Referring back to FIG. 1, upon evaluation and selection, the selected players are recommended as potential game friends or buddies, at box 140. Further, at box 150, the selected players are accommodated for playing as game friends or buddies. In one implementation, accommodation involves presenting a list of recommended potential game friends or buddies when a player first logs in through an interface. As discussed above, to increase the likelihood of a particular player accepting the recommended "strangers" as online friends or buddies, a social graph showing how the recommended "strangers" are related to the particular player through the current and/or existing friends can be presented to the particular player. This also promotes brand loyalty since having active friends or buddies in the game keep game players around longer and lead to more downloadable content sales and recruitment of new players.

Figure 3:
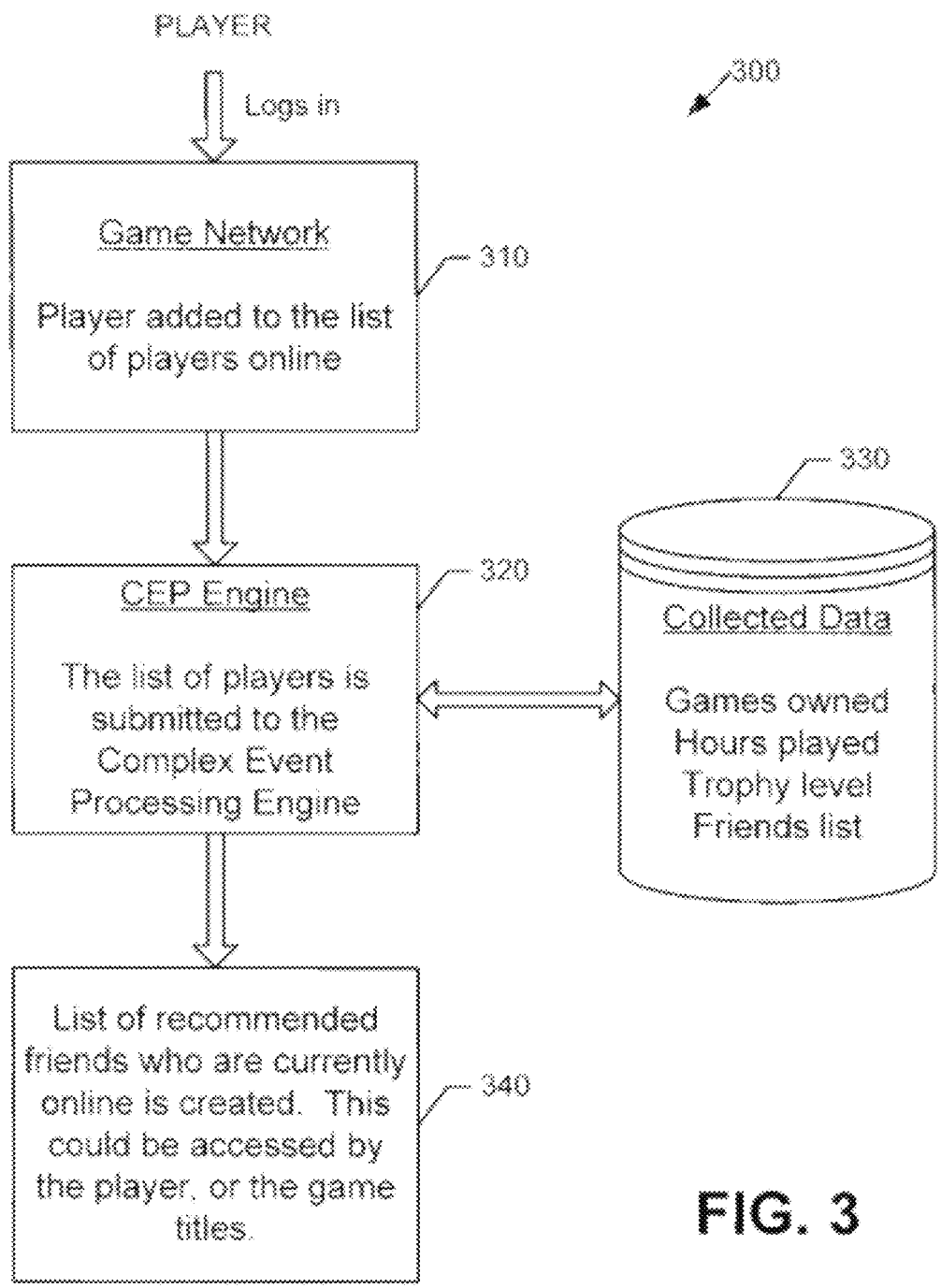
FIG. 3 shows a system model for recommending game-playing friends based on game player's habits for playing online games in accordance with one implementation of the present invention.

FIG. 3 shows a system model 300 for recommending game-playing friends based on game player's habits for playing online games in accordance with one implementation of the present invention. The system model 300 includes a game network 310, a complex event processing (CEP) engine 320, and a storage 330 including collected data.

In one implementation, when a particular player logs into a game network 310, the network 310 adds the particular player to a list of players online in the game. The network 310 collects playing habits of online game players and stores the collected data in the storage 330. As discussed above, in general, the playing habits are collected and stored in advance prior to the particular player logging into the game. However, the playing habits can be collected and/or updated when the particular player logs into the game. The collected data includes time of day played, type of games played, interest of the player, clan membership of the player, type of friends in the real world, type of games owned or purchased, number of hours played, relationship to the player of the friend being recommended, and other similar data such as games owned by the online game players.

The complex event engine 320 receives the list of players from the game network 310 and the collected playing habits data from the storage 330. The complex event engine 320 then processes the information including the list and the data to select online game players matching a set number of criteria including playing habits that are similar or complementary. In one implementation, the complex event engine 320 and the storage 330 are coupled to the game network 310. In another implementation, the complex event engine 320 and the storage 330 are configured to be included in the game network 310. Upon processing and selection, the selected players are recommended as potential game friends or buddies 340.

Figure 4A:
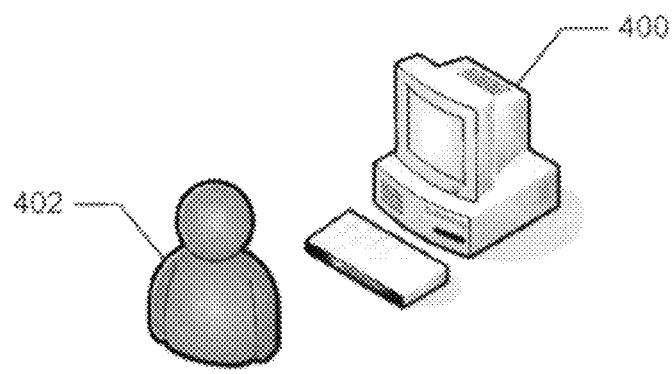
FIG. 4A illustrates a representation of a computer system and a user.

FIG. 4A illustrates a representation of a computer system 400 and a user 402. The user 402 uses the computer system 400 to recommend game-playing friends based on a game player's habits for playing online games which promotes better playing experience for the game player. The computer system 400 stores and executes a buddy match system 490.

Figure 4B:
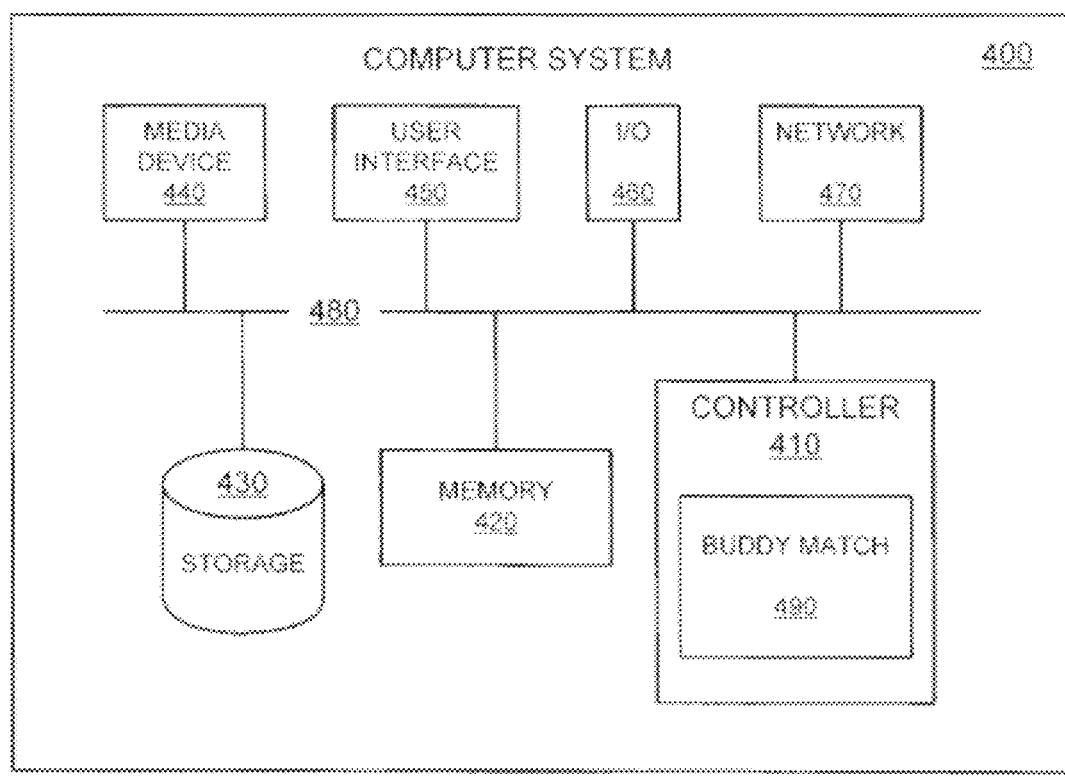
FIG. 4B is a functional block diagram illustrating the computer system hosting the buddy match system.

FIG. 4B is a functional block diagram illustrating the computer system 400 hosting the buddy match system 490. The controller 410 is a programmable processor and controls the operation of the computer system 400 and its components. The controller 410 loads instructions (e.g., in the form of a computer program) from the memory 420 or an embedded controller memory (not shown) and executes these instructions to control the system. In its execution, the controller 410 provides the buddy match system 490 as a software system. Alternatively, this service can be implemented as separate hardware components in the controller 410 or the computer system 400.

Memory 420 stores data temporarily for use by the other components of the computer system 400. In one implementation, memory 420 is implemented as RAM. In one implementation, memory 420 also includes long-term or permanent memory, such as flash memory and/or ROM.

Storage 430 stores data temporarily or long term for use by other components of the computer system 400, such as for storing data used by the buddy match system 490. In one implementation, storage 430 is a hard disk drive.

The media device 440 receives removable media and reads and/or writes data to the inserted media. In one implementation, for example, the media device 440 is an optical disc drive.

The user interface 450 includes components for accepting user input from the user of the computer system 400 and presenting information to the user. In one implementation, the user interface 450 includes a keyboard, a mouse, audio speakers, and a display. The controller 410 uses input from the user to adjust the operation of the computer system 400.

The I/O interface 460 includes one or more I/O ports to connect to corresponding I/O devices, such as external storage or supplemental devices (e.g., a printer or a PDA). In one implementation, the ports of the I/O interface 460 include ports such as: USB ports, PCMCIA ports, serial ports, and/or parallel ports. In another implementation, the I/O interface 460 includes a wireless interface for communication with external devices wirelessly.

The network interface 470 includes a wired and/or wireless network connection, such as an RJ-45 or "Wi-Fi" interface (including, but not limited to 802.11) supporting an Ethernet connection.

The computer system 400 includes additional hardware and software typical of computer systems (e.g., power, cooling, operating system), though these components are not specifically shown in FIG. 4B for simplicity. In other implementations, different configurations of the computer system can be used (e.g., different bus or storage configurations or a multi-processor configuration).

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Accordingly, additional implementations and variations are also within the scope of the invention. For example, the illustrated implementations discuss collecting and processing game player's habits for playing online games to recommend game-playing friends. However, in other implementations, habits, behaviors, and/or preferences of users in general can be collected and processed in similar techniques as described above to provide other services such as advanced matchmaking for marriage, roommates, and other endeavors needing compatibility. Further, it is to be understood that the description and drawings presented herein are representative of the subject matter which is broadly contemplated by the present invention. It is further understood that the scope of the present invention fully encompasses other implementations that may become obvious to those skilled in the art and that the scope of the present invention is accordingly limited by nothing other than the appended claims.

Additionally, the steps of a method or technique described in connection with the implementations disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An example storage medium can be coupled to the processor such that the processor can read information from, and write information to, the storage medium. In the alternative, the storage medium can be integral to the processor. The processor and the storage medium can also reside in an ASIC.

What is claimed is:

1. A computer-implemented method of recommending game-playing friends or buddies to a particular online game player, the method comprising:
   receiving and storing on a storage unit at least one of playing habits, behaviors, and preferences of online game players;
   selecting from the storage unit by a processor a subset of the online game players matching a set number of criteria of the at least one of playing habits, behaviors, and preferences that are similar or complementary to the particular online game player,
   wherein selecting a subset of the online game players includes selecting online game players currently in an online game with the particular online game player;
   recommending the subset of the online game players selected as matching a set number of criteria as game-playing friends or buddies,
   wherein matching a set number of criteria is determined by keeping a match count and the match count exceeding a predetermined number;
   generating a social graph showing how the selected subset of the online game players are related to the particular game player through a current or existing friends of the particular online game player; and
   presenting the social graph to the particular online game player,
   wherein presenting the social graph increase the likelihood of the particular online game player accepting the recommended subset of the online game players as online friends or buddies.

2. The computer-implemented method of claim 1, further comprising
   collecting preference data including collecting the least one of playing habits, behaviors, and preferences of the online game players.

3. The computer-implemented method of claim 2, wherein the collected preference data comprises at least one of
time of day played, type of games played, interest of the online game players, clan membership of the online game players, type of friends in the real world, type of games owned or purchased, number of hours played, and relationship to a player of friends being recommended.

4. The computer-implemented method of claim 1, wherein selecting a subset of the online game players comprises
selecting a subset of all online game players whose playing habits, behaviors, and preferences are available to a selection entity.

5. The computer-implemented method of claim 1, further comprising
accommodating the selected subset of the online game players matching a set number of criteria to play an online game with the particular online game player.

6. A system to recommend game-playing friends to a particular game player based on game player's habits for playing an online game, the system comprising:
a game network configured to add game players logging into the game network to a list of players on the online game, the game network collecting playing habits of the game players;
a complex event engine configured to receive the list of players from the game network and the collected playing habits data from the storage unit, the complex event engine operating to process information including the list of players and the collected playing habits data to select a subset of the game players matching a set number of criteria including playing habits that are similar or complementary to the particular game player,
wherein selecting a subset of the game players includes selecting online game players currently in the online game with the particular game player,
wherein matching a set number of criteria is determined by keeping a match count and the match count exceeding a predetermined number; and
a social graph showing a relationship between the selected subset of the online game players and the particular game player through a current or existing friends of the particular game player.

7. The system of claim 6, further comprising a storage unit configured to store the collected playing habits.

8. The system of claim 7, wherein the collected playing habits stored in the storage unit comprise at least one of
time of day played, type of games played, interest of the game players, clan membership of the game players, type of friends in the real world, type of games owned or purchased, number of hours played, and relationship to the particular game player of friends being recommended.

9. The system of claim 6, wherein a subset of the online game players comprises
a subset of all online game players whose playing habits, behaviors, and preferences are available to a selection entity.

10. The system of claim 6, further comprising
an interface configured to present a list of recommended potential game friends or buddies when the particular game player first logs in.

11. A non-transitory tangible storage medium storing a computer program for recommending game-playing friends or buddies to a particular online game player, the computer program comprising executable instructions that cause a computer to:
receive at least one of playing habits, behaviors, and preferences of online game players;
select a subset of the online game players matching a set number of criteria of the at least one of playing habits, behaviors, and preferences that are similar or complementary to the particular online game player,
wherein selecting a subset of the online game players includes selecting online game players currently in an online game with the particular online game player; and
recommend the subset of the online game players selected as matching a set number of criteria as game-playing friends or buddies,
wherein matching a set number of criteria is determined by keeping a match count and the match count exceeding a predetermined number;
generate a social graph showing how the selected subset of the online game players are related to the particular online game player through a current or existing friends of the particular game player; and
present the social graph to the particular online game player.

12. The non-transitory tangible storage medium of claim 11, further comprising executable instructions that cause a computer to
collect preference data including the least one of playing habits, behaviors, and preferences of the online game players.

13. The non-transitory tangible storage medium of claim 12, wherein the collected preference data comprises at least one of
time of day played, type of games played, interest of the online game players, clan membership of the online game players, type of friends in the real world, type of games owned or purchased, number of hours played, and relationship to a player of friends being recommended.

14. The non-transitory tangible storage medium of claim 11, wherein executable instructions that cause a computer to select a subset of the online game players comprise executable instructions that cause a computer to
select a subset of all online game players whose playing habits, behaviors, and preferences are available to a selection entity.

15. The non-transitory tangible storage medium of claim 11, further comprising executable instructions that cause a computer to
accommodate the selected subset of the online game players matching a set number of criteria to play an online game with the particular online game player.

* * * * *